Patented Dec. 11, 1923.

1,477,321

UNITED STATES PATENT OFFICE.

ELTON R. DARLING, OF MONTCLAIR, NEW JERSEY, ASSIGNOR TO ELLIS-FOSTER COMPANY, A CORPORATION OF NEW JERSEY.

PROCESS OF TREATING BISMUTH ORES.

No Drawing.   Application filed April 1, 1919. Serial No. 286,705.

*To all whom it may concern:*

Be it known that I, ELTON R. DARLING, a citizen of the United States, residing at Montclair, in the county of Essex and State of New Jersey, have invented certain new and useful Improvements in Processes of Treating Bismuth Ores, of which the following is a specification.

This invention relates to a method of treating bismuth ores and the like and relates especially to a method of treating bismuth ores such for example as bismuthite by leaching methods following by a furnacing operation all as will be hereinafter described and as claimed.

In order to extract the ore I preferably employ the latter in a powdered form and treat it with hydrochloric acid solution. This may be conveniently prepared from sulphuric acid and common salt which extracting agent has some advantages because the saline material present tends to aid in the solution of the bismuth material. The extraction is best carried out with a warm or hot solution and this may be conveniently prepared by adding strong sulphuric acid to a solution of brine, the heat of hydration of the sulphuric acid warming the reagent to the requisite temperature. The powdered ore of whatever description employed is stirred into the solution and agitated until extraction has reached practical completion. The solution is then filtered and preferably diluted with a solution of salt and the free acidity neutralized. In the presence of sodium chloride the basic compound of bismuth is not readily precipitated on dilution so that I am enabled to get a comparatively concentrated solution of bismuth compound in this manner. This step of producing a relatively concentrated solution of a bismuth compound by virtue of the presence of a substantial amount of a saline body such as sodium chloride or sulphate and the subsequent treatment of this concentrated solution as, for example, by neutralization or other operation in connection with the production of high grade bismuth or its compounds constitutes a specific feature of the present invention. After the neutralization step the product may be poured into water to precipitate the bismuth oxychloride which is filtered, washed and dried. This material may be powdered if necessary and mixed with charcoal or other reducing agent and a fluxing compound or neutralizing body such as sodium carbonate. The charge is then heated in a furnace and the metallic bismuth formed is collected. If desired this metal may be re-melted and skimmed to further purify it.

By using a sodium chloride solution or brine as a diluting agent for the initial solution of bismuth it is possible to work throughout with fairly concentrated solutions so that the enormous bulk heretofore employed in making bismuth preparations is done away with to a substantial degree, and moreover bismuth material of an exceptional high grade of purity may be obtained. This is of especial importance in the manufacture of bismuth compounds intended for medical or pharmaceutical purposes.

While I do not wish to be limited to any precise method of operation as my invention is capable of various modifications, as will be evident to those skilled in the art now that I have made the present disclosure, but as an illustration of my preferred method of operation the following may be stated.

624 kilograms of sodium chloride are dissolved in 2000 litres of water and to this added, with agitation, 800 kilograms of the ore. While the whole is in the state of agitation 1040 kilograms of sulphuric acid are added, causing a rise in temperature to the point where solution takes place. The agitation is continued until the solution shows a clear yellow color and a scum which sometimes forms upon the surface disappears. To this is then added 2000 litres of warm water and the whole filtered. The resulting solution is then poured into an equal volume of a 30% solution of sodium chloride and the free acid contained in said solution neutralized by caustic soda or such alkalies as will not produce a precipitate or sediment in the solution. When the free acidity has been neutralized it is then poured into 20 times its volume of water, well stirred and the white precipitate of bismuth oxychloride filtered, well washed and dried. The dry salt is then mixed in a ratio of 5 kilograms of bismuth oxychloride, 2.5 kilograms of sodium carbonate and 500 grams of powdered charcoal. The mixture is then heated in a crucible until reduction to the metal takes place.

The solution obtained by the extraction of bismuth ores with hydrochloric acid or more particularly with a solution obtained by mixing sulphuric acid and salt may be used to prepare a double salt of bismuth and sodium or other element by proceeding for example in the following manner. The filtered solution from the extraction of the ore is evaporated until a crystalline product is obtained and this is redissolved in a 30% solution of common salt which is preferably heated to facilitate the solution of the crystals. This solution is then filtered and allowed to crystallize when the double salt of sodium and bismuth chloride is obtained. By using other bases the corresponding double salts of bismuth and other elements are secured.

By another modification of my invention I may make bismuth compounds particularly the oxychloride of bismuth from the oxide. For example bismuth obtained by the foregoing method or from any other suitable source may be oxidized to form bismuth trioxide. This is heated with an aqueous solution of a salt for example of the chloride at a temperature sufficient to bring about decomposition producing bismuth oxychloride and caustic soda. The latter may be neutralized as the reaction progresses so that its presence in quantity will not hinder the velocity of reaction. The latter may be expressed as follows:

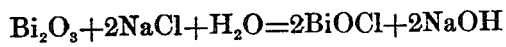

$$Bi_2O_3 + 2NaCl + H_2O = 2BiOCl + 2NaOH$$

In carrying out this reaction the following procedure may be employed:

460 parts of bismuth trioxide are suspended in 1000 parts of water contained in a vessel fitted with a stirring device and capable of being heated to a temperature of 100° C. To this is then added 250 parts of sodium chloride and the whole agitated until the sodium chloride has entered into solution. The heat is then applied so that there is a gradual increase in the temperature of the solution. The caustic soda at once begins to form and is neutralized by the slow addition of a 5% solution of hydrochloric acid in such amounts as to react and yet not allow for the presence of free acid at any point. When the temperature has reached the boiling point the reaction is completed and the bismuth oxychloride may be recovered by filtering, washing and drying. In producing this compound I may also mix the substances mentioned together in the dry state to obtain a mixture suitable for the production of the bismuth oxychloride which when in an aqueous solution in the condition cited will undergo double decomposition as herein described. I may also employ other than atmospheric pressure in carrying out this reaction and do not limit myself to the use of hydrochloric acid for neutralizing the alkalinity but may employ any other suitable acid.

Another feature of my invention is the production of bismuth free from selenium and tellurium which are very commonly found in bismuth ores. One method by which this may be carried out is to produce a solution of bismuth with its impurities for example, as by producing the chloride by digestion of the ore with hydrochloric acid or with a mixture of salt and sulphuric acid. The filtered solution for example as obtained above is poured into an equal volume of a 30% solution of sodium chloride. An excess of acid is present in this solution and preferably neutralized by the addition of, for example, sodium carbonate. In the presence of a considerable amount of sodium chloride the neutralization may be carried out until a neutral or nearly neutral condition is attained without the formation of a precipitate which would interfere with the carrying out of the further stages of the operation. The resulting solution is treated with sulphur dioxide as for example by bubbling the gas through the solution. By this treatment selenium and tellurium bodies are precipitated, the bismuth remains in solution. Another way of carrying out the operation is simply to saturate the solution with sulphur dioxide and allow to stand when tellurium and selenium will be precipitated. After the reduction the solution is digested at a moderate temperature to free it from excess of the gas, this may be facilitated by agitating the solution. The latter is filtered and the bismuth compound obtained. The latter may be reduced to the metallic state if desired as by the process above indicated. The use of sodium chloride serves the purpose of retaining the bismuth in solution in an advantageous manner.

What I claim is:

1. The process of making bismuth material which comprises extracting a bismuth-containing ore with a reagent containing hydrochloric acid, in filtering and diluting the solution with a solution of common salt, in neutralizing the free acidity, introducing into a considerable volume of water, filtering, washing and drying whereby bismuth oxychloride is obtained.

2. In the production of bismuth material the steps which comprise forming a solution of a bismuth salt, in neutralizing the free acidity in the presence of a saline body present in substantial amount at the time of such neutralization and in precipitating an oxy compound of bismuth by diluting such solution.

3. In the process of treating bismuth ores containing selenium or tellurium or both so as to free the ores from selenium and tellurium, the steps which consist in digesting the ore with hydrochloric acid, filtering the resulting solution, diluting the solution with a solution of sodium chloride, and adding sufficient sulphur dioxide to saturate the solution with sulphur dioxide gas, whereby the selenium or tellurium or both, are precipitated.

4. In the process of treating bismuth ores containing selenium or tellurium or both so as to free the ores from selenium and tellurium, the steps which consist in digesting the ore with sulphuric acid and salt, filtering the resulting solution, diluting the solution with a solution of sodium chloride, and adding sufficient sulphur dioxide to saturate the solution with sulphur dioxide gas, whereby the selenium or tellurium or both, are precipitated.

5. In the process of treating bismuth ores containing selenium or tellurium or both so as to free the ores from selenium and tellurium, the steps which consist in digesting the ore with sulphuric acid and a chloride of a metal, filtering the resulting solution, diluting the solution with a solution of sodium chloride, and adding sufficient sulphur dioxide to saturate the solution with sulphur dioxide gas, whereby the selenium or tellurium or both, are precipitated.

ELTON R. DARLING.